J. H. WYGANT.
Car Starter.
No. 29,536.
Patented Aug, 7, 1860.
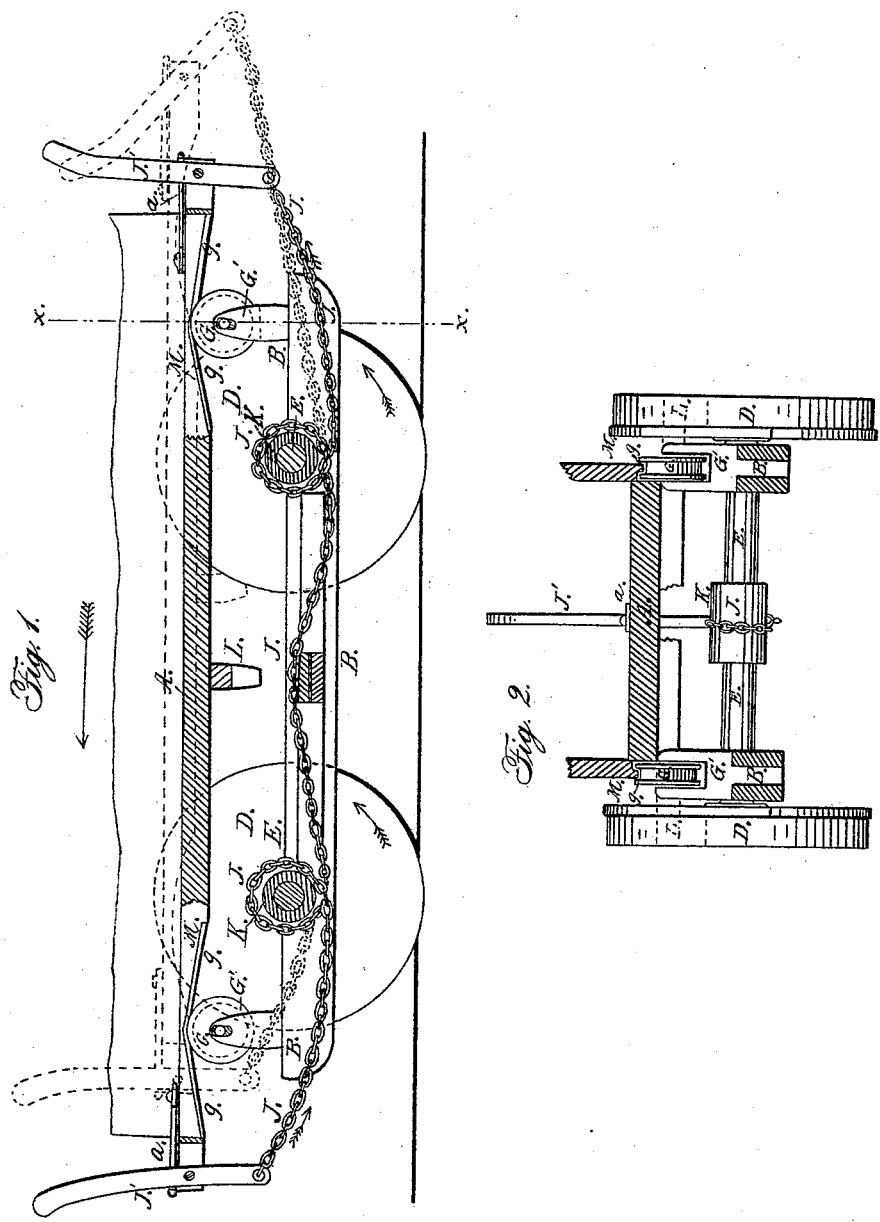
Witnesses:
Inventor:

UNITED STATES PATENT OFFICE.

JOHN H. WYGANT, OF HACKENSACK, NEW JERSEY.

STOPPING AND STARTING CITY RAILROAD-CARS.

Specification of Letters Patent No. 29,536, dated August 7, 1860.

*To all whom it may concern:*

Be it known that I, JOHN H. WYGANT, of Hackensack, in the county of Bergen and State of New Jersey, have invented a new and useful Improvement in Stopping and Starting Street Railroad-Cars; and I do hereby declare that the following is a full, clear, and exact description thereof, reference being had to the accompanying drawings, making part of this specification, in which—

Figure 1, is a longitudinal vertical section taken through the truck and flooring of a street railroad car, with my inprovement applied to the same. Fig. 2, is a transverse section taken through the vertical plane indicated in Fig. 1, by the red line $x, x$.

Similar letters of reference indicate corresponding parts in both figures.

The object of this invention is to take advantage of the momentum acquired by a car while in motion, and apply it to the stopping and starting of the car so as to assist the animals that draw the car in starting it from a dead stand. It consists in mounting the car body on suitable friction rollers projecting up from the truck frame at front or rear of said frame and arranging double inclined planes in such a relation to the friction rollers that when the car is suddenly stopped by applying a chain brake to the axles, the body of the car will be moved backward and up the inclined planes, where it is held until the car is to start, and on releasing the brakes again the body of the car will move forward and impart its movement to the wheels so as to start them, when the horses may proceed with comparative ease as will be hereinafter described and represented.

To enable those skilled in the art to fully understand my invention I will proceed to describe its construction and operation.

In the drawings A, represents the floor of the body of a street railroad car.

B, is the truck frame and D, are the car wheels, of which E, are their axles.

G, are grooved friction rollers that have their bearings in brackets G'. The boxes of these rollers may rest upon rubber or steel springs.

J, is a brake chain that passes from the brake levers J', to the enlargements K, K, on axles E, E, and once or twice around these enlargements. The chain is continuous, that is to say there is one chain extending from lever (J') to lever (J'). $a$, are hooks to keep the levers in place when the brakes are applied.

L, are brakes for the wheels which may or may not be used.

This description will give a general idea of the parts used in carrying out my invention. They now operate in the following manner: Two bottom timbers M, M, are applied to each side of the car body, which timbers have double inclined surfaces $g, g$, formed on their under sides which surfaces should be lined with iron to prevent rapid wear. These inclined surfaces rest on the rollers and when the car is in motion the body A, keeps in the position shown in Fig. 1, the rollers being at an intermediate point between the double inclined surfaces. The rollers G, are flanged on each side and the inclined surfaces should have grooves in them for preventing any lateral play of the car body.

The car body is allowed to have an end play which is to be controlled by the driver from either end of the car, by a brake chain or chains or their equivalent. Said chains pass around both cylindrical enlargements K, on these axles, and connect at each end to suitable brake levers so that by operating one of these levers, so as to draw taut on the chain while the car is in motion, the chains will be wound up on the axles and at the same time the motion of the wheels is checked the body of the car will be drawn backward and up the forward inclined planes on the rollers G. At the same time side brakes may be brought to act upon the peripheries of the wheels to assist in bringing the car to a stand. The car body now rests in a position from which it will roll forward when the brake chain is released and the more weight that is put into the car body the greater will be the impulse given to the wheels in its forward movement down the inclines. Thus when the car body is allowed to move forward, by releasing the brakes the momentum that it will acquire in its forward movement will be imparted to the truck frame and wheels, and by starting the horses, at this moment the motion of the car may be kept up by them with much less exertion than in the present method where they are required to start the heavy car from a "dead stand."

It will be seen that by applying a very slight pressure on the brake lever at either end of the car only sufficient to tighten the turn of the chain, on the axles, the forward movement of the wheels will wind the chain up, and draw the body of the car back on the truck frame as before described, and as represented in Fig. 1 in red lines.

From this description it will be seen that the momentum acquired by the car while in motion is controlled and applied in such a manner that the stopping, and starting again of the car, is effected with comparative ease. At the same time the horses are not required to start the car from a stand, nor to stop the car.

Having thus described my invention what I claim as new and desire to secure by Letters Patent is—

1. The combination of the inclined planes arranged on a car body having an end play, or on the truck frame with the friction rollers G, G, or their equivalents arranged substantially, as and for the purposes herein set forth.

2. In combination with a car body hung in such a manner on rollers as to ride on inclined planes the chain brake, operataing upon the car axles, and attached at both ends to the car body, as and for the purposes set forth.

JOHN H. WYGANT.

Witnesses:
B. GIROUXE,
M. M. LIVINGSTON.